(12) United States Patent
Cremer

(10) Patent No.: US 7,621,554 B1
(45) Date of Patent: Nov. 24, 2009

(54) HITCH SUPPORT SYSTEM

(76) Inventor: Robert L. Cremer, 325 E. 8th St., Miller, SD (US) 57362

( * ) Notice: Subject to any disclaimer, the term of this patent is extended or adjusted under 35 U.S.C. 154(b) by 435 days.

(21) Appl. No.: 11/271,430

(22) Filed: Nov. 9, 2005

Related U.S. Application Data (60) Provisional application No. 60/594,583, filed on Apr. 20, 2005.

(51) Int. Cl.
*B60D 1/36* (2006.01)
(52) U.S. Cl. .................................. 280/477; 280/476.1
(58) Field of Classification Search .............. 280/476.1, 280/477
See application file for complete search history.

(56) References Cited

U.S. PATENT DOCUMENTS

| | | | | |
|---|---|---|---|---|
| 745,803 | A * | 12/1903 | Edeline ........................ 280/83 |
| 2,376,001 | A | 5/1945 | Nogle ........................ 280/33.4 |
| 2,381,190 | A | 8/1945 | Tiner et al. ................. 280/33.4 |
| 2,450,215 | A * | 9/1948 | Wilson ........................ 280/443 |
| 2,460,466 | A | 2/1949 | Nogle ........................ 280/33.4 |
| 2,506,718 | A | 5/1950 | Grant ........................ 280/33.4 |
| 2,534,575 | A * | 12/1950 | Conley et al. .............. 280/405.1 |
| 2,592,219 | A * | 4/1952 | West et al. ................. 280/476.1 |
| 2,639,159 | A | 5/1953 | Milligan et al. .......... 280/33.44 |
| 2,699,341 | A | 1/1955 | Brettrager ................... 280/476 |
| 2,773,703 | A | 12/1956 | Ferguson et al ............. 280/476 |
| 2,828,973 | A * | 4/1958 | Blackman ................. 280/476.1 |
| 2,844,389 | A | 7/1958 | Burnett ....................... 280/476 |
| 3,595,527 | A * | 7/1971 | Douglass .................... 254/420 |
| 3,865,405 | A | 2/1975 | Mitchell et al. ............. 280/476 |
| 3,888,515 | A | 6/1975 | Winter ........................ 280/476 |
| 4,253,679 | A | 3/1981 | Sargent ....................... 280/405 |
| 4,537,261 | A | 8/1985 | Hatzell ......................... 172/44 |
| 4,648,617 | A * | 3/1987 | Hannappel ................ 280/304.3 |
| 5,016,900 | A * | 5/1991 | McCully ..................... 280/477 |
| 5,501,482 | A | 3/1996 | McClive ..................... 280/503 |
| 5,609,350 | A | 3/1997 | Chumley et al. .......... 280/476.1 |
| 5,823,558 | A * | 10/1998 | Shoquist .................. 280/405.1 |
| 6,182,997 | B1 | 2/2001 | Ullrich et al. ............ 280/476.1 |
| 6,213,491 | B1 * | 4/2001 | Southard, Jr. ............... 280/475 |
| 6,224,083 | B1 | 5/2001 | Tyler ....................... 280/476.1 |
| 6,419,247 | B1 | 7/2002 | Moran ....................... 280/86.5 |
| 6,446,997 | B1 | 9/2002 | Bergman et al. ......... 280/414.3 |
| 6,616,373 | B1 | 9/2003 | Kennedy ........................ 405/1 |
| 6,685,211 | B2 * | 2/2004 | Iles ......................... 280/476.1 |
| 6,739,601 | B1 * | 5/2004 | Fine ............................... 280/3 |
| 6,820,887 | B1 | 11/2004 | Riggle |
| 2002/0171224 | A1 | 11/2002 | Iles ........................ 280/476.1 |
| 2003/0042707 | A1 * | 3/2003 | McCarty ..................... 280/477 |
| 2005/0194761 | A1 * | 9/2005 | Givens ........................ 280/477 |

* cited by examiner

*Primary Examiner*—Lesley D. Morris
*Assistant Examiner*—Maurice Williams
(74) *Attorney, Agent, or Firm*—Rick Martin; Patent Law Offices of Rick Martin, P.C.

(57) ABSTRACT

A hitch support system for relieving a portion of the weight placed upon a rear end of a vehicle. The hitch support system includes a connecting structure for connecting to a hitch unit of a vehicle and for receiving a receiver, a vertical member adjustably connected to the connecting structure, and a wheel rotatably connected to a lower end of the vertical member. When the connecting structure is connected to the hitch unit of a vehicle, the wheel supports the extra weight of the vehicle or the extra weight of a trailer attached to the receiver.

5 Claims, 12 Drawing Sheets

FIG. 11

HITCH SUPPORT SYSTEM

CROSS REFERENCE TO RELATED APPLICATIONS

I hereby claim benefit under Title 35, United States Code, Section 119(e) of U.S. provisional patent application Ser. No. 60/594,583 filed Apr. 20, 2005. The 60/594,583 application is currently pending. The 60/594,583 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to vehicle hitch devices and more specifically it relates to a hitch support system for relieving a portion of the weight placed upon a rear end of a vehicle.

2. Description of the Related Art

Any discussion of the prior art throughout the specification should in no way be considered as an admission that such prior art is widely known or forms part of common general knowledge in the field.

Vehicles have been in use for years. The weight that some trailers or vehicle loads place on the back of the vehicle can be great, and among other things, can cause loss of steering and control. Typically, we have used equalizer bars to relieve a portion of the weight placed upon a rear end of a vehicle. These bars attach to the frame or rear of the vehicle and distribute the tongue weight toward the rear end of the trailer.

There are also devices similar to this invention, but instead of using just one stabilizing wheel, they have two stabilizing wheels. This makes storage for the device, when not in use, more troublesome. Because of the increased size in these two wheeled hitch systems, there may also be more of a hassle to connect them to your vehicle and may require the help more than one person.

Some problems that accompany these equalizer bars are that they are difficult to maneuver around because of their bulkiness and awkward shape. They also only redistribute weight when the vehicle is hooked up to some type of trailer. This limits the equalizer bars availability for usage. At times the vehicle may need some type of stabilization because of a heavy load directly on the vehicle and an equalizer bar will not be sufficient.

While these devices may be suitable for the particular purpose to which they address, they are not as suitable for relieving a portion of the weight placed upon a rear end of a vehicle. Particular solutions to relieving weight place upon the back of the vehicle in the past are shown through their limited adaptability (only being able to function with the use of a trailer), and their unnecessary size compared to what is needed to provide stabilization of the vehicle.

In these respects, the hitch support system according to the present invention substantially departs from the conventional concepts and designs of the prior art, and in so doing provides an apparatus primarily developed for the purpose of relieving a portion of the weight placed upon a rear end of a vehicle.

BRIEF SUMMARY OF THE INVENTION

In view of the foregoing disadvantages inherent in the known types of vehicle hitch devices now present in the prior art, the present invention provides a new hitch support system construction wherein the same can be utilized for relieving a portion of the weight placed upon a rear end of a vehicle.

The general purpose of the present invention, which will be described subsequently in greater detail, is to provide a new hitch support system that has many of the advantages of the vehicle hitch device mentioned heretofore and many novel features that result in a new hitch support system which is not anticipated, rendered obvious, suggested, or even implied by any of the prior art relating to vehicle hitch devices, either alone or in any combination thereof.

To attain this, the present invention generally comprises a connecting structure for connecting to a hitch unit of a vehicle and for receiving a receiver, a vertical member adjustably connected to the connecting structure, and a wheel rotatably connected to a lower end of the vertical member. When the connecting structure is connected to the hitch unit of a vehicle, the wheel supports the extra weight of the vehicle or the extra weight of a trailer attached to the receiver.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a hitch support system that will overcome the shortcomings of the prior art devices.

A second object is to provide a hitch support system for relieving a portion of the weight placed upon a rear end of a vehicle.

Another object is to provide a hitch support system that increases a vehicle operator's ability to control a vehicle.

An additional object is to provide a hitch support system that is compatible with the standard receiver size of most vehicles.

A further object is to provide a hitch support system that that is adjustable in height as to accompany different size vehicles along with different size loads.

Another object is to provide a hitch support system that is simple to attach to any vehicle with a standard receiver, and may be easily taken apart for convenient storage.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 11 illustrate a hitch support system 10, which comprises a connecting structure 20 for connecting to a hitch unit a female hitch receiver 13 of a vehicle 12 and for receiving a receiver 14, a vertical member beam 30 adjustably connected to the connecting structure 20, and a wheel 70 rotatably connected to a lower end of the vertical member beam 30. When the connecting structure 20 is connected to the hitch unit female hitch receiver 13 of a vehicle 12, the wheel 70 supports the extra weight of the vehicle 12 or the extra weight of a trailer 16 attached to the receiver 14.

B. Connecting Structure

Figure 2:
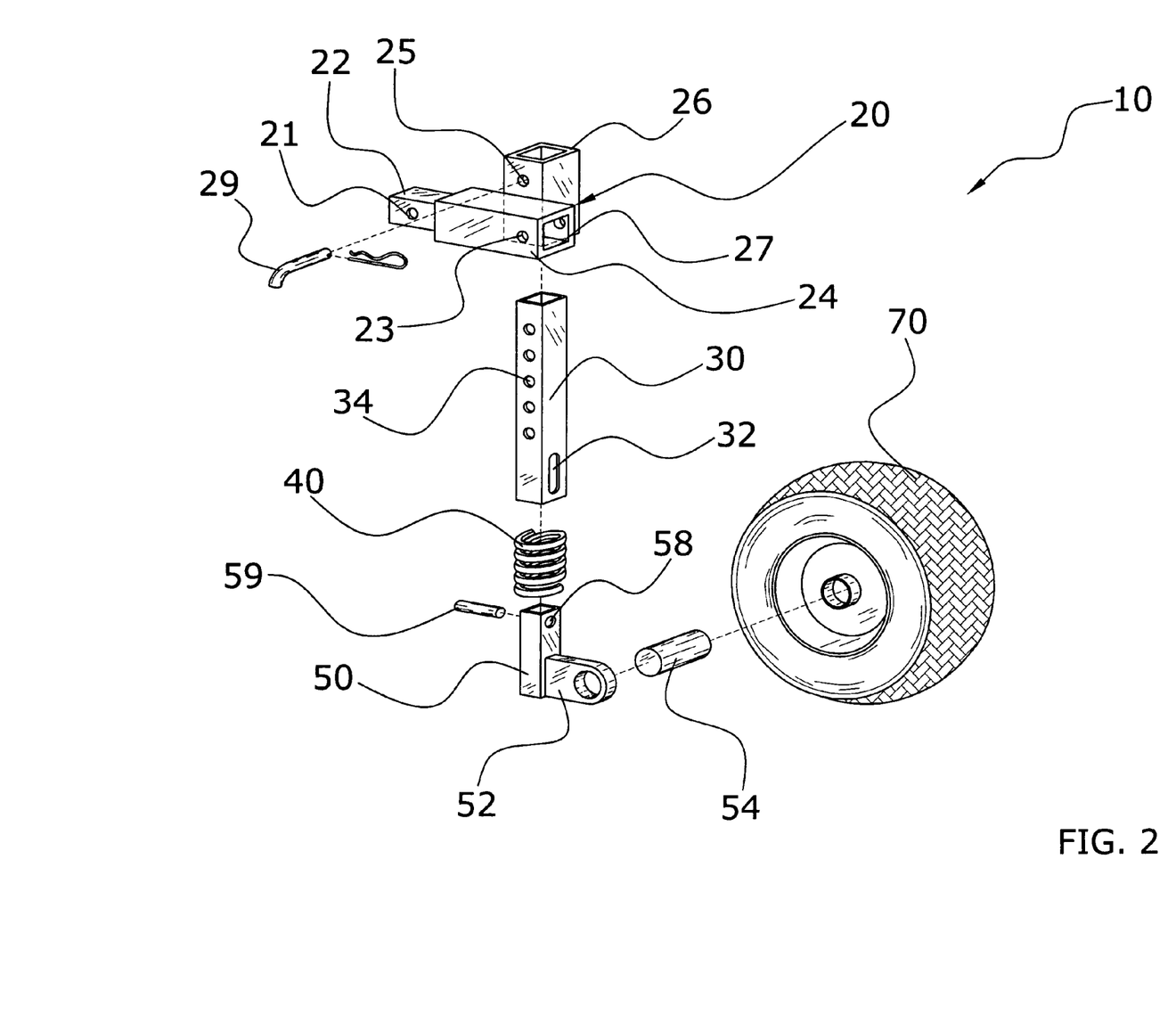
FIG. 2 is an exploded upper perspective view of the present invention.
Figure 3:
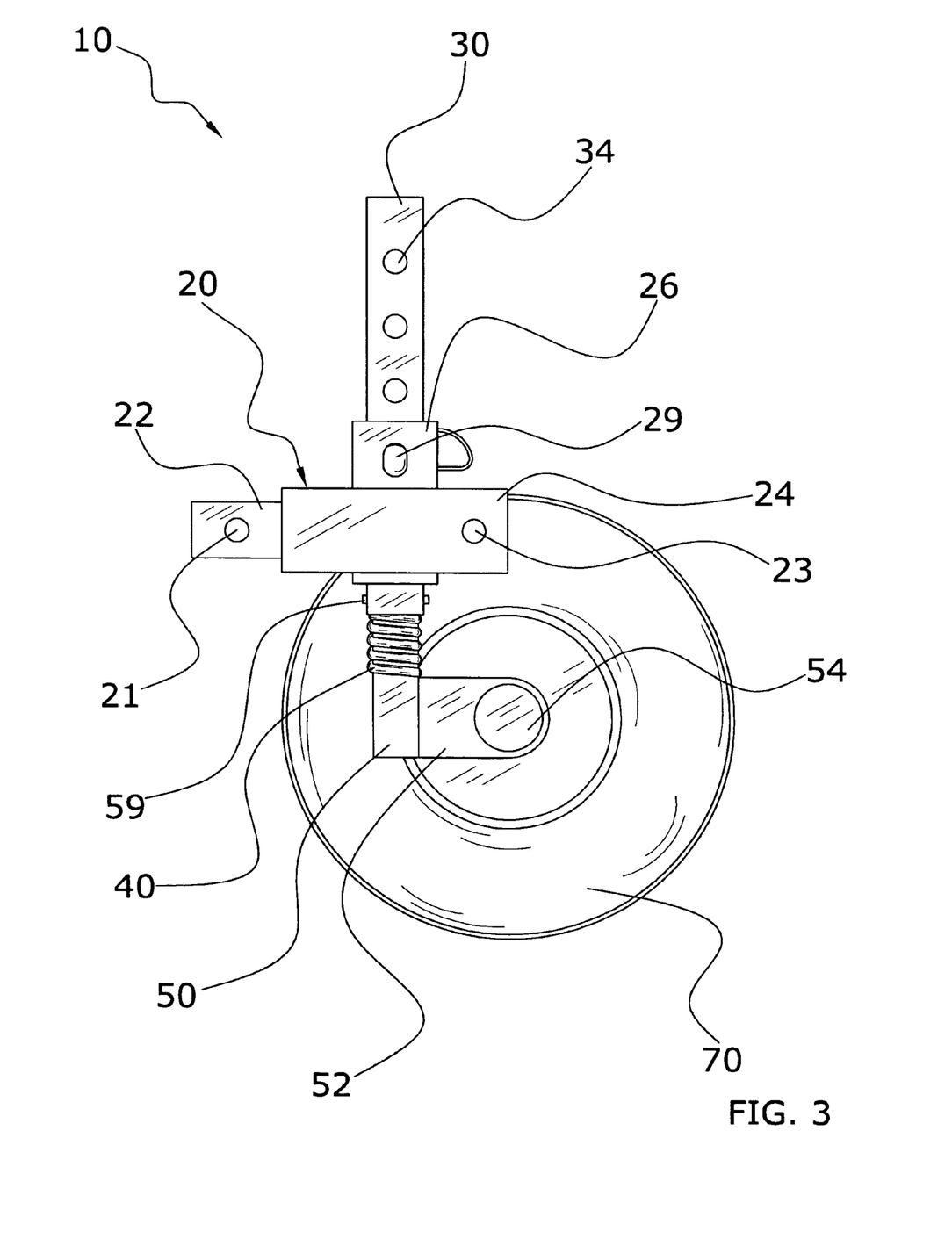
FIG. 3 is a right side view of the present invention in the lowest vertical position.

FIG. 2 best illustrates the connecting structure 20. The connecting structure 20 is formed for being removably received within a hitch unit 13 of a vehicle 12. In addition, the connecting structure 20 is formed for removably receiving a receiver 14 for allowing connection to a trailer 16 as best illustrated in FIG. 8a of the drawings.

Figure 1:
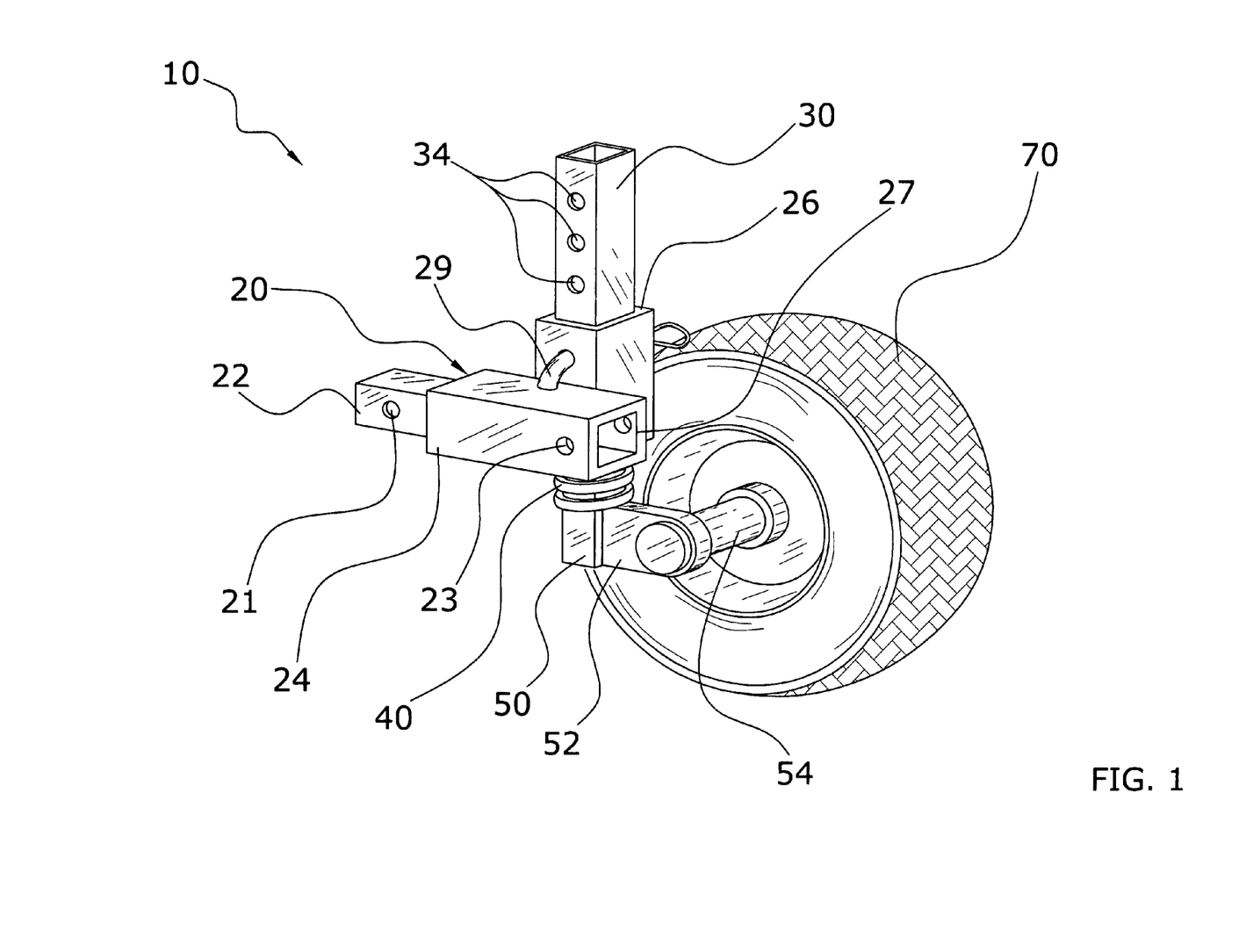
FIG. 1 is an upper perspective view of the present invention.
Figure 10:
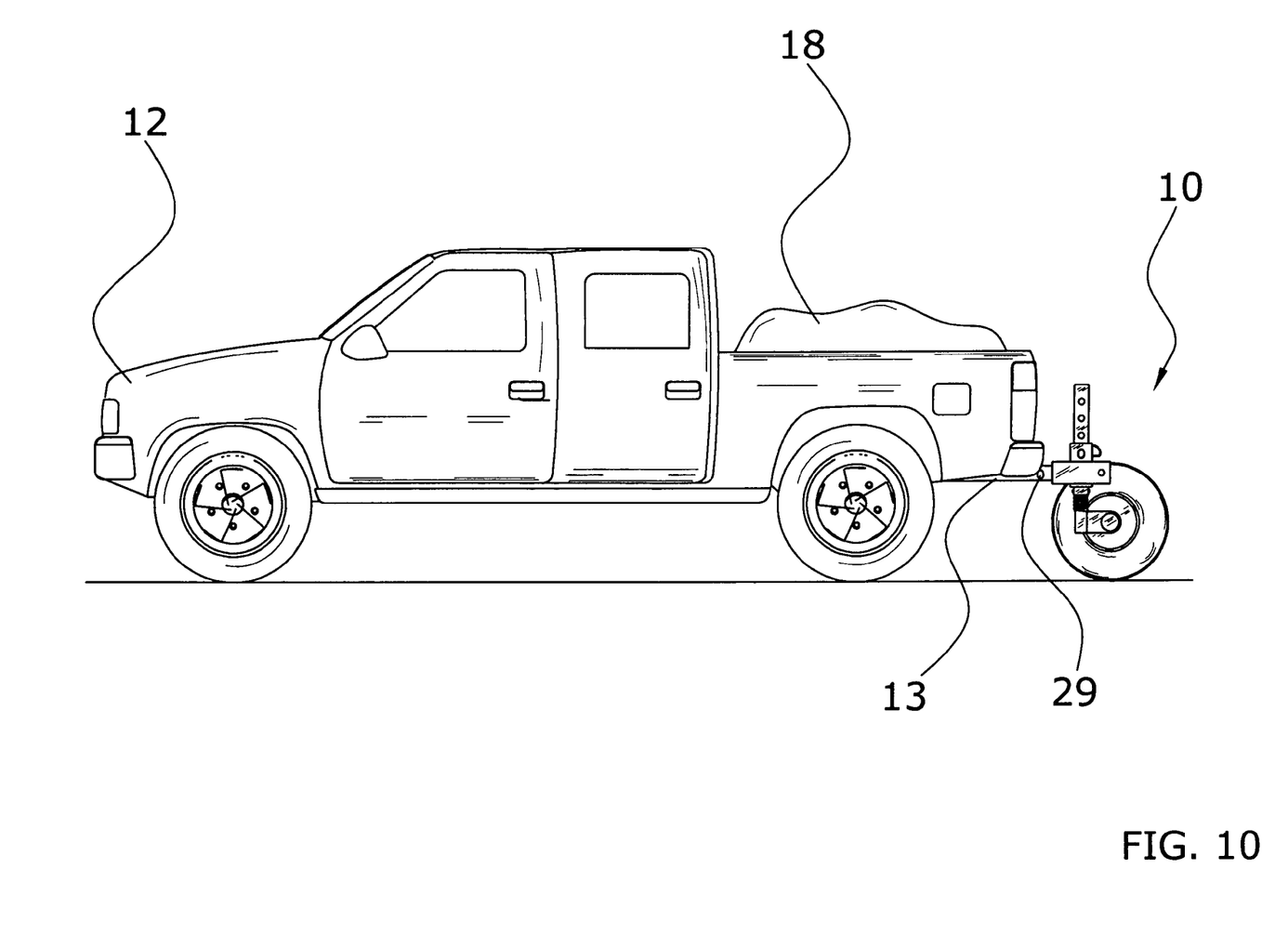
FIG. 10 is a right side view of the present invention used for stabilizing a vehicle that is carrying a load.
Figure 11:
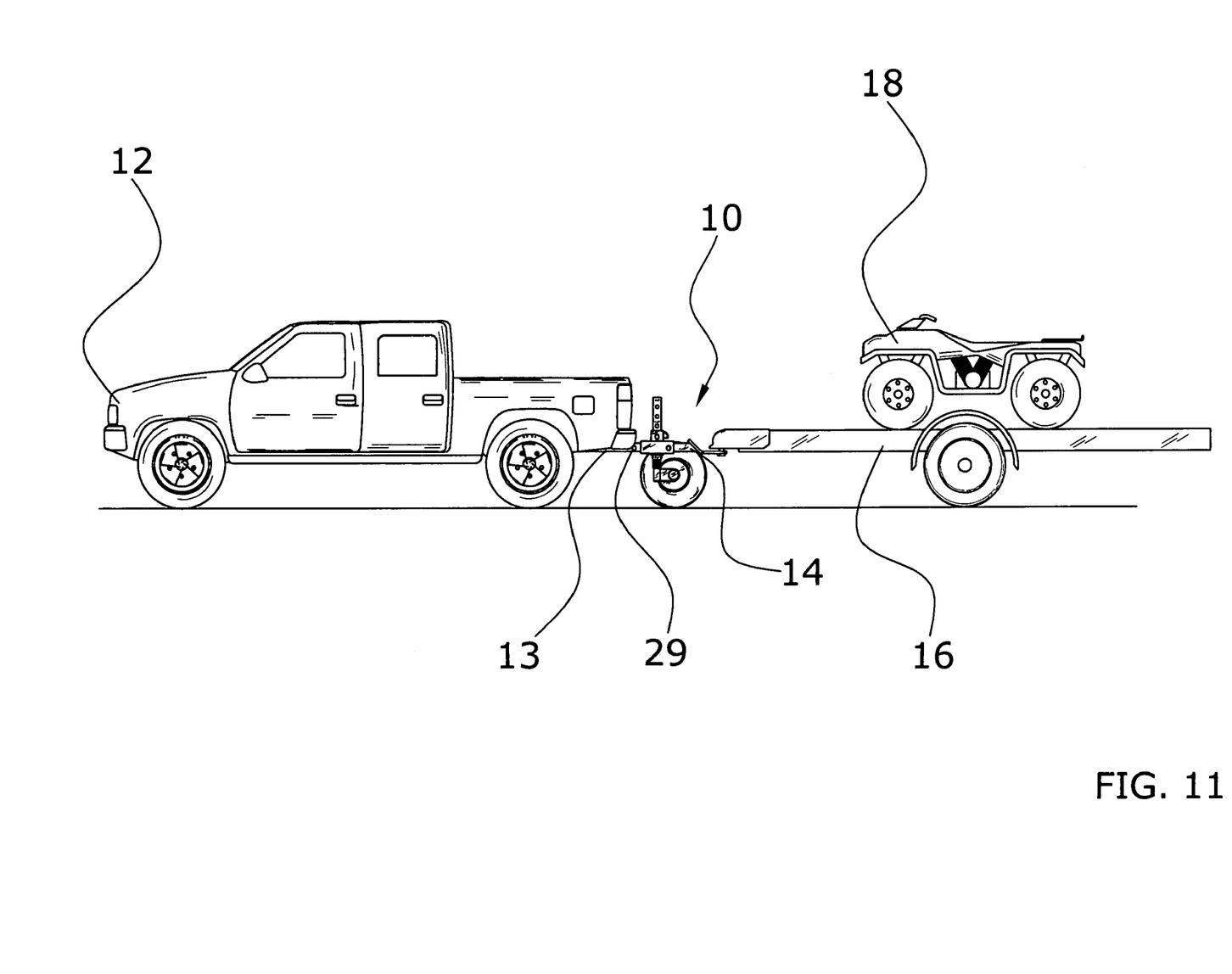
FIG. 11 is a right side view of the present invention used for stabilizing a vehicle that is pulling a load.

The connecting structure 20 preferably comprises a first member 22 and a second member 24 extending from the first member 22 in a substantially longitudinal manner as best illustrated in FIGS. 1 and 2 of the drawings. The first member 22 is formed for being removably inserted into an opening within a hitch unit 13 of a vehicle 12 as best illustrated in FIGS. 10 and 11 of the drawings. The first member 22 includes at least one first aperture 21 for receiving a hitch pin 29 extending through an aperture within the hitch unit 13 of the vehicle 12 thereby securing the connecting structure 20 to the hitch unit 13 of the vehicle 12 as illustrated in FIGS. 1, 2, 10 and 11 of the drawings.

The second member 24 extends rearwardly from the first member 22 as best illustrated in FIG. 1 of the drawings. The second member 24 is preferably concentrically positioned with respect to the first member 22, however it can be appreciated that the second member 24 may be connected to the first member 22 in a non-concentrically manner.

Figure 8A:
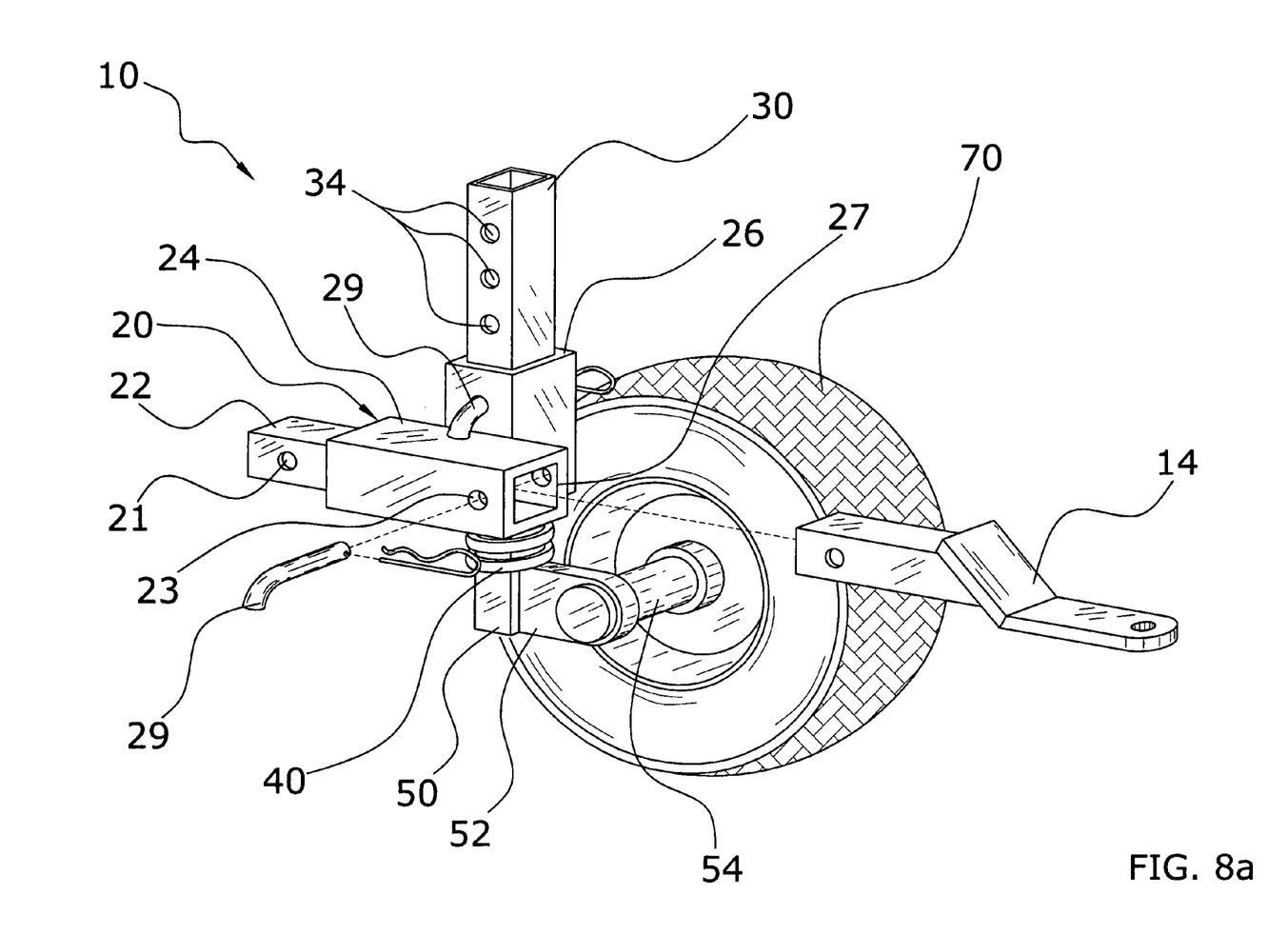
FIG. 8a is an upper perspective view of the present invention with an exploded standard receiver hitch.
Figure 8B:
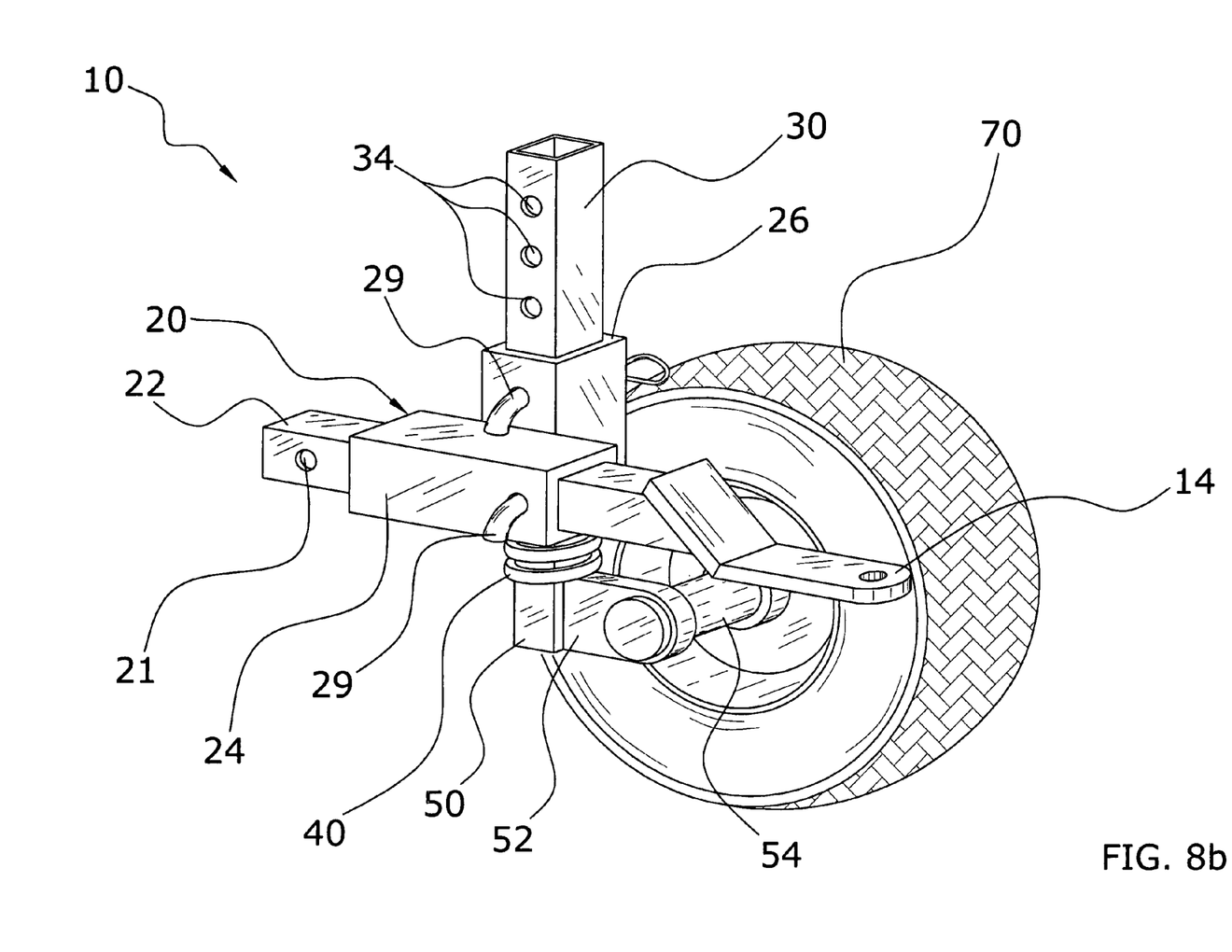
FIG. 8b is an upper perspective view of the present invention with a standard receiver hitch in place.
Figure 9:
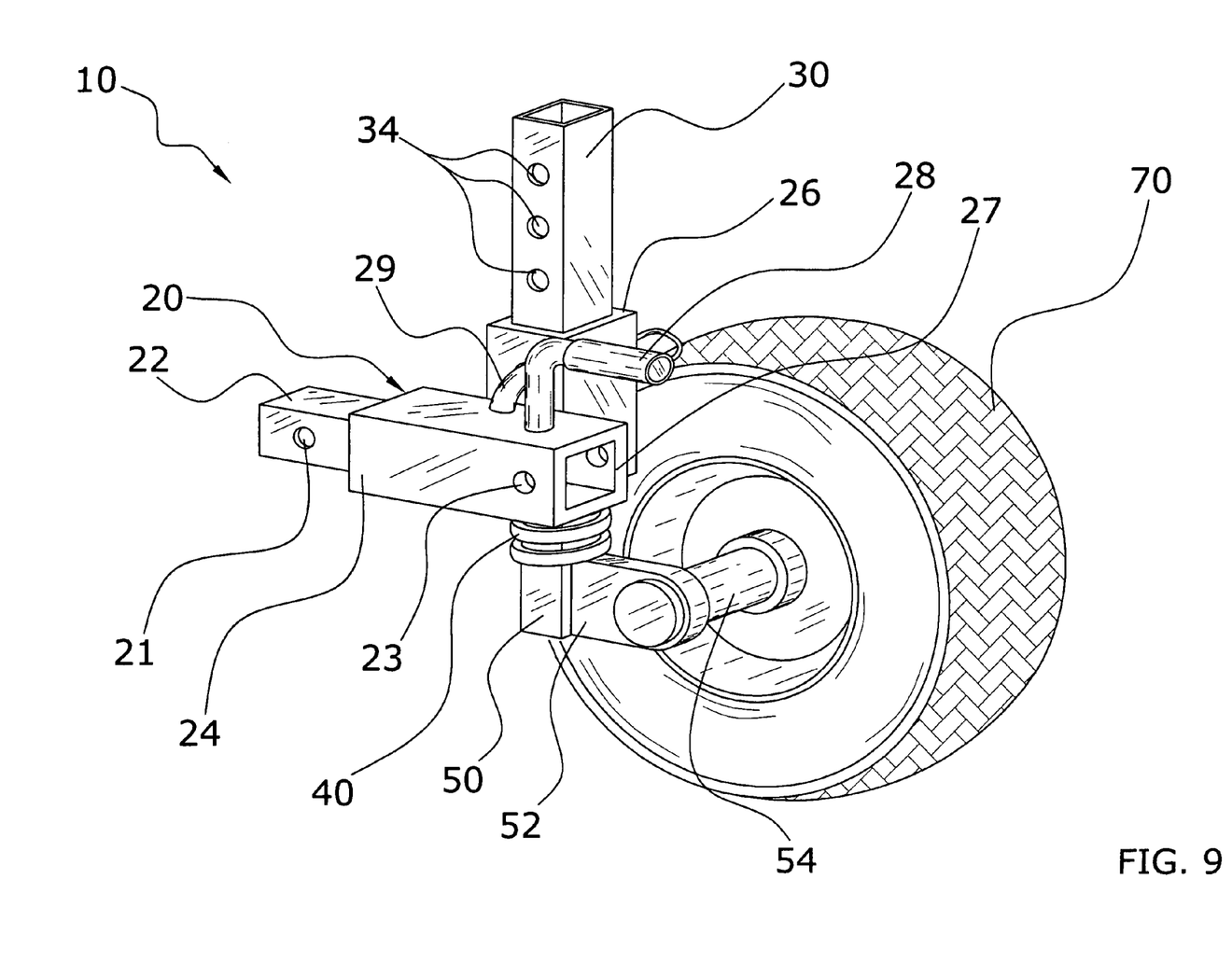
FIG. 9 is an upper perspective view of the present invention with an optional handle for easy maneuvering.

The second member 24 is preferably comprised of a tubular structure having a rear aperture 27 that receives a tongue portion of a receiver 14 as best illustrated in FIGS. 8a and 8b of the drawings. The rear aperture 27 is preferably comprised of a rectangular or square cross sectional structure as are commonly utilized for receivers 14 or other cross sectional shapes suitable for usage with respect to receivers 14. In addition, a second aperture 23 extends transversely through the second member 24 to receive a hitch pin 29 or similar structure for selectively securing the receiver 14 within the second member 24 as best illustrated in FIGS. 8a and 8b of the drawings. A handle 28 may be attached to the second member 24 for providing convenient gripping by a user for transporting the present invention during non-use as shown in FIG. 9 of the drawings.

The connecting structure 20 further preferably comprises a third member mounting collar 26 attached substantially transversely to the second member 24 in a vertical manner as best shown in FIG. 2 of the drawings. The third member 26 preferably is comprised of a tubular structure for adjustably receiving the vertical member 30 as illustrated in FIGS. 1 through 11 of the drawings. The third member 26 includes at least one third aperture 25 for receiving a hitch pin 29 or similar structure that extends through adjustment apertures 34 within the vertical member 30.

C. Vertical Member

The vertical member 30 is comprised of an elongated structure that is adjustably received within the third member 26 as illustrated in FIGS. 1 and 2 of the drawings. A plurality of adjustment apertures 34 preferably extend through the vertical member 30 as best illustrated in FIG. 2 of the drawings. The adjustment apertures 34 within the vertical member 30 allow for selective vertical adjustment of the vertical member 30 within the third member 26 to accommodate various heights of hitch units 13 and loads 18.

A slot 32 preferably extends through the vertical member 30 as best illustrated in FIG. 2 of the drawings. The slot 32 receives a pin member 59 for guiding and preventing removal of the vertical member 30 from the lower member 50.

D. Lower Member

The lower member wheel base 50 is preferably slidably received within a lower end of the vertical member 30 as illustrated in FIGS. 1 through 5 of the drawings. Alternatively, the lower member 50 is non-movably connected to the vertical member 30. The lower member 50 preferably has a cross sectional shape similar or identical to the cross sectional shape of the lower end of the vertical member 50. A pin aperture 58 extends through the lower member 50 for receiving the pin member 59 as best illustrated in FIG. 2 of the drawings.

A lower connecting member 52 extends from the lower member 50 as best illustrated in FIGS. 1 through 8 of the drawings. The lower connecting member 52 extends away from the vehicle 12 and towards the trailer 16 for alignment of the wheel 70 during operation of the present invention.

A spring 40 is preferably placed over the lower member 50 and rests on the lower connecting member 52 or other structure. The spring 40 is preferably comprised of a compression spring, however other biasing devices may be utilized. The vertical member 30 is placed over the lower member 50 so that the slot 32 and the pin aperture 58 match up, with the slot 32 being on the outer edge of the pin aperture 58. Once the slot 32 and the pin aperture 58 match up, the pin member 59 is placed through, securing the vertical member 30 to the lower member. The slot 32 allows the spring 40 to flex by allowing the vertical member 30 and the connecting structure 20 to adjust with the vehicle 12 to bumps or curvatures in the road or weight placed upon the vehicle 12.

E. Wheel

The wheel 70 is rotatably attached to the lower connecting member 52 as best illustrated in FIG. 1 of the drawings. The wheel 70 is attached to the lower connecting member 52 via an spindle 54 or other device capable of rotatably supporting the wheel 70 with relatively heavy loads.

The wheel 70 rests on the ground during usage (FIGS. 10 and 11) and provides the vehicle 12 with the extra support to equalize the weight of the load 18. The wheel 70 provides an upward force on the rear end of the vehicle 12, which in the process of adding a load 18 to the vehicle 12, either directly or with the use of a trailer 16, approximately equalizes out the weight placed upon the vehicle 12 by the load 18.

F. Operation of Invention

In use, the first member 22 of the connecting structure 20 is first lined up and connected with respect to the hitch unit 13 of the vehicle 12. The vertical member 30 is then adjusted to a desired vertical position with respect to the connecting structure 20 to provide the best fit for the current hitch unit 13 height. Once the desired vertical position of the vertical member 30 is determined, the user then secures the vertical member 30 within the connecting structure 20 with the hitch pin 29 as best illustrated in FIG. 1 of the drawings.

After the connecting structure 20 is connected to the hitch unit 13, the user then secures the receiver 14 within the second member 24 of the connecting structure 20 as illustrated in FIGS. 8a and 8b of the drawings. It can be appreciated that the receiver 14 does not need to be attached to the connecting structure 20 if a trailer is not to be attached. Once the receiver 14 is attached to the connecting structure 20, the user then secures the trailer 16 to the receiver 14 as illustrated in FIGS. 10 and 11 of the drawings.

Figure 4:
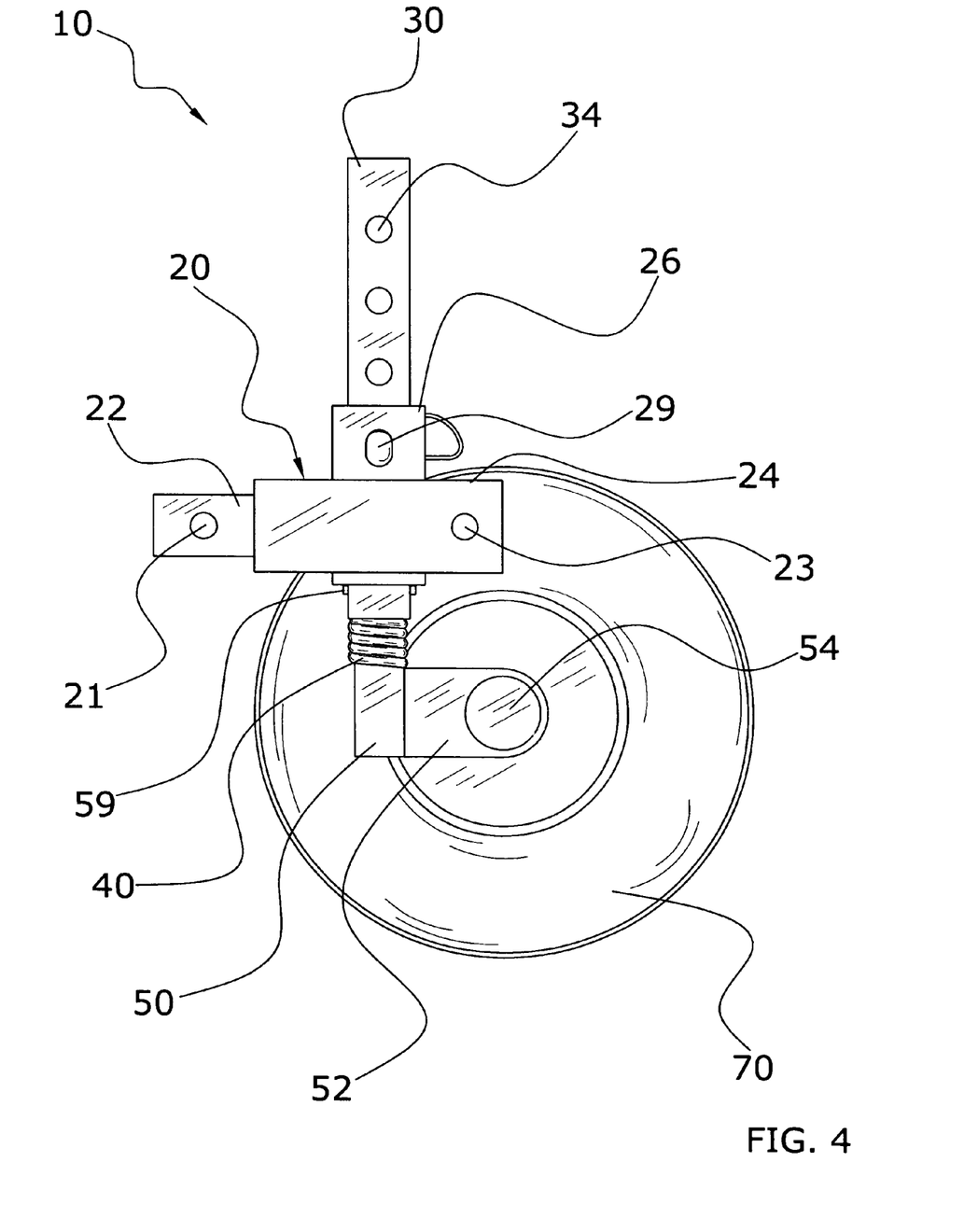
FIG. 4 is a right side view of the present invention in the lowest vertical position with the spring compressed.
Figure 5:
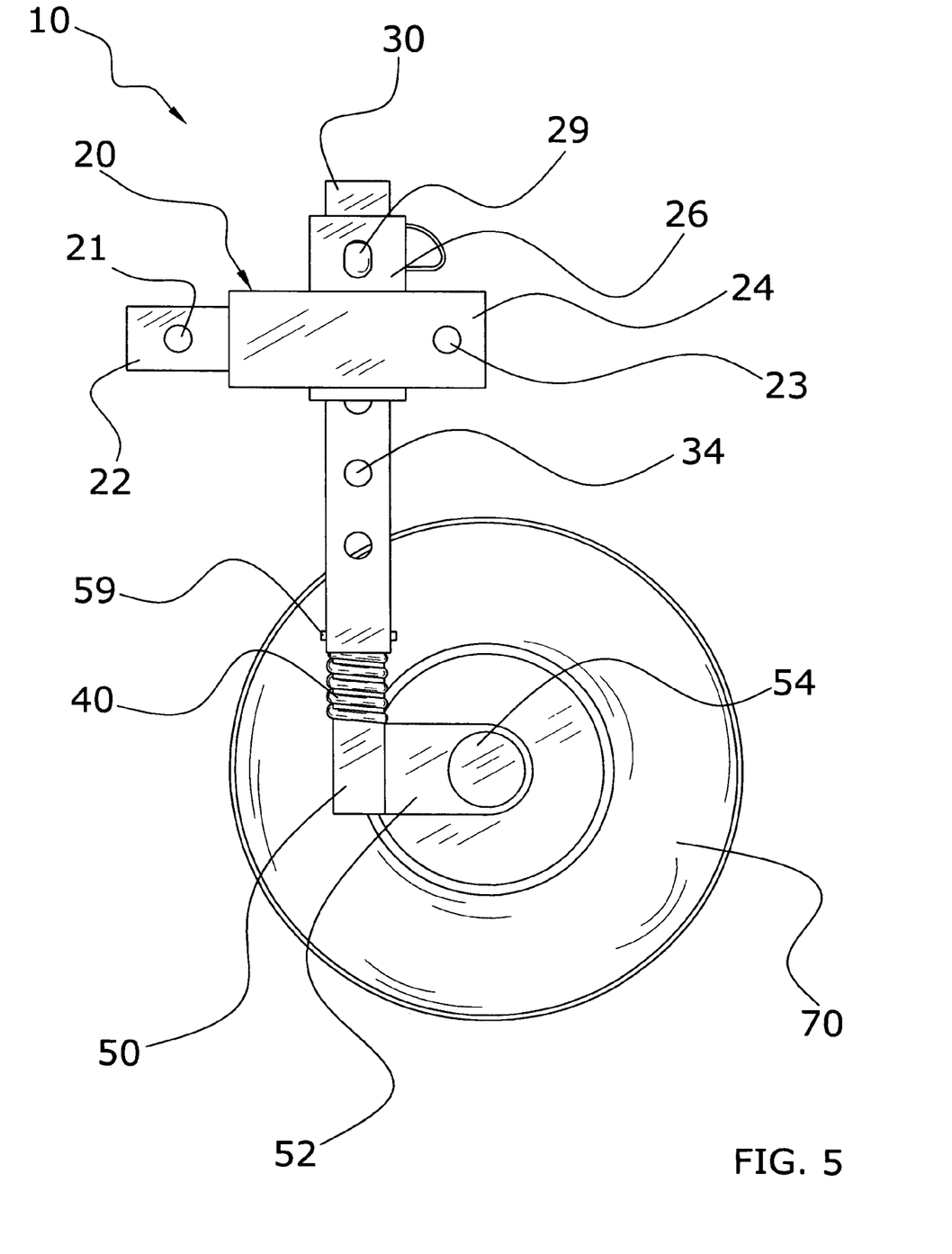
FIG. 5 is a right side view of the present invention in the highest vertical position.
Figure 6:
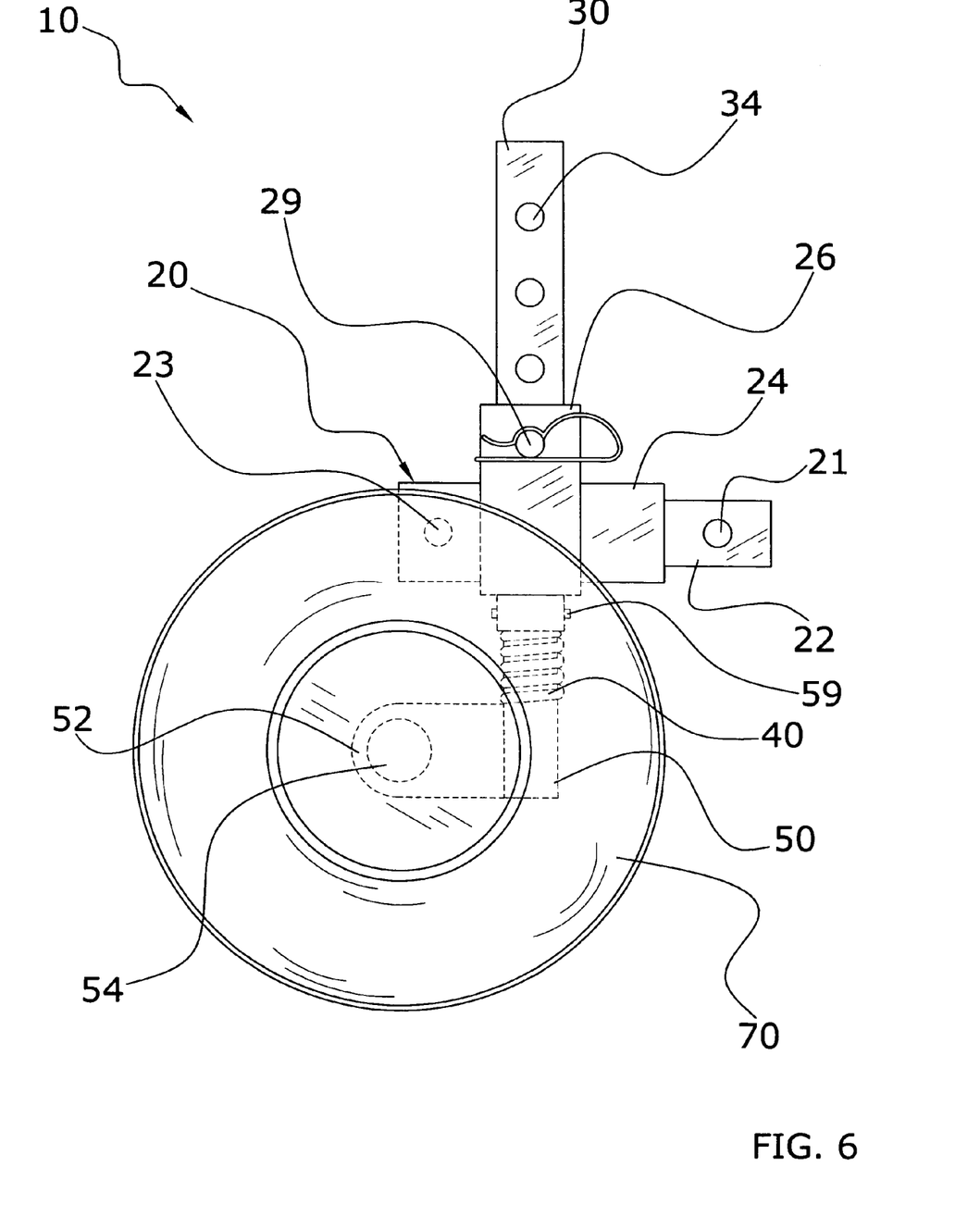
FIG. 6 is a left side view of the present invention in the lowest vertical position.
Figure 7:
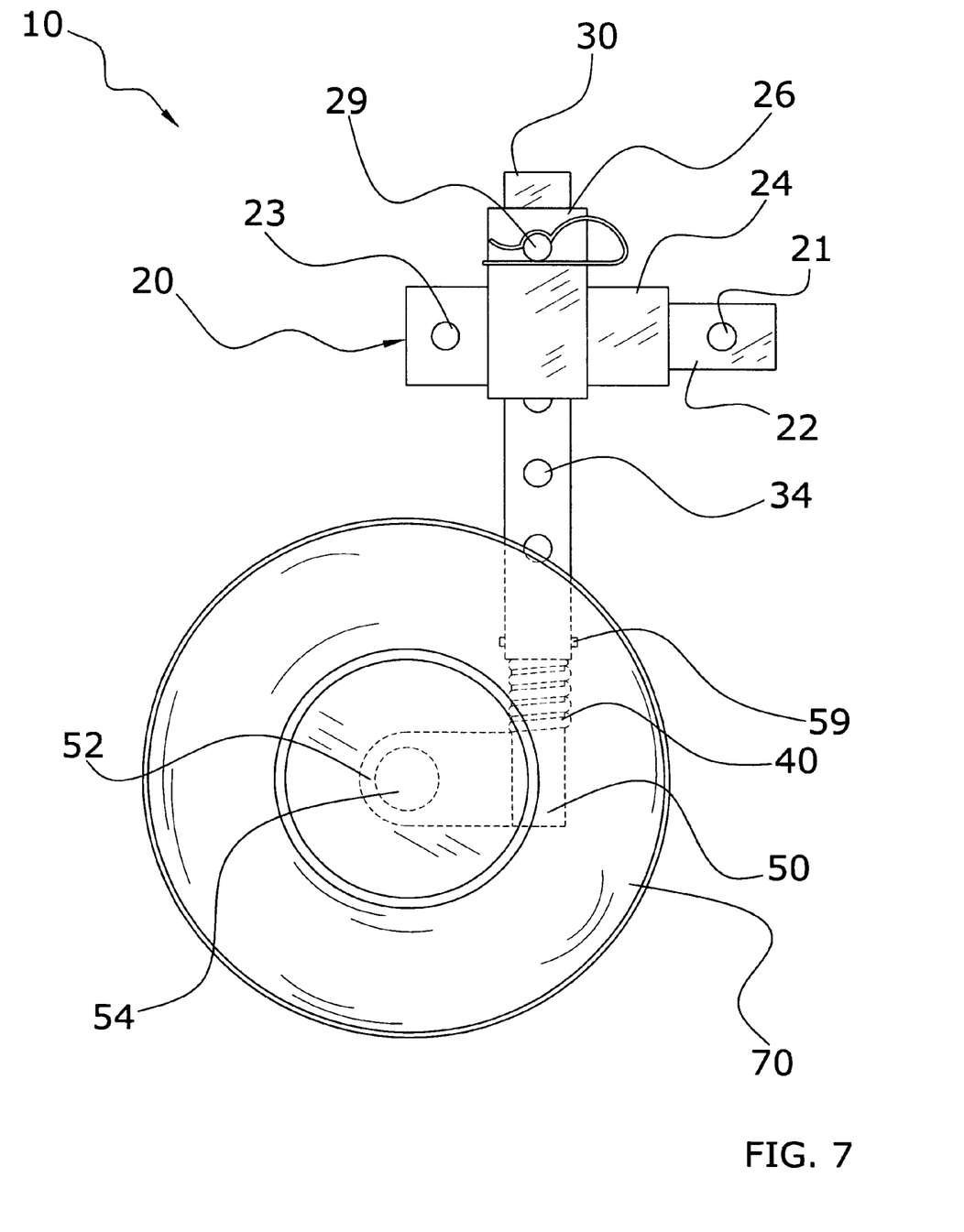
FIG. 7 is a left side view of the present invention in the highest vertical position.

Once the trailer 16 is properly attached to the receiver 14, the user then is able to operate the vehicle 12 to pull the trailer 16 with the load 18 to a desired location. During travel with the trailer 16 (or without the trailer 16), the wheel 70 provides additional vertical support to the rear end of the vehicle 12 to prevent overloading the rear suspension of the vehicle 12 and to assist in operation of the vehicle 12. When the trailer 16 or other load 18 is attached to the vehicle 12, the vertical member 30 is forced downwardly thereby compressing the spring 40 as best illustrated in FIG. 4. However, it is preferable that the spring 40 not be completely compressed by the load 18 and/or trailer 16 to accommodate irregularities (e.g. bumps, dips, rocks) in the travel path thereby preventing excessive force upon the hitch unit 13 or the trailer 16 during operation. When the user is finished utilizing the present invention, the above process is simply reversed to remove the present invention from the vehicle 12.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A hitch support system, comprising:
    a connecting structure for connecting a hitch unit of a vehicle and for receiving a receiver;
    a vertical member beam connected to said connecting structure, wherein said vertical member beam includes a plurality of adjustment apertures for allowing selective vertical positioning of said vertical member beam within said connecting structure;
    a wheel rotatably connected to a lower end of the vertical member beam via a spindle which is supported by a connecting member that is in turn connected to a lower member that is in turn connected to the vertical member beam;
    wherein said connecting structure includes a tongue that is removably receivable within the hitch unit of the vehicle;
    wherein said connecting structure includes a second member extending from said connecting structure and wherein said second member includes a rear aperture for removably receiving the receiver;
    wherein said connecting structure includes a third member attached transversely to said connecting structure that adjustably receives said vertical member beam;
    wherein a minimum load sharing with the hitch unit of the vehicle is set via a lower adjustment aperture and a hitch pin therethrough;
    wherein a maximum load sharing with the hitch unit of the vehicle is set via an upper adjustment aperture and the hitch pin therethrough; and
    wherein a load bearing spring is placed over the lower member and is supported between the connecting member and the base of the vertical member beam;
    said connecting member slidably mounted inside the vertical member beam by a pin means functioning to allow the connecting member to ride in a slot in the vertical member beam.

2. A hitch support system, comprising:
    a connecting structure for connecting a hitch unit of a vehicle and for receiving a receiver;
    a vertical member adjustably connected to said connecting structure;
    a lower member movably attached to a lower end of said vertical member by a pin riding in a slot of the vertical member;
    a spring positioned between said lower member and said vertical member so that said lower end of said vertical member compresses said spring towards said lower member by said lower end pushing upon said spring;
    a wheel rotatably connected to said lower member via a spindle connected to the lower member;

wherein said connecting structure includes a rear aperture for removably receiving the receiver;
wherein said connecting structure includes a tongue that is removably receivable within the hitch unit of the vehicle;
wherein said connecting structure includes a third member that adjustably receives said vertical member;
wherein said vertical member is adjustably attached to said connecting structure in a vertical manner;
wherein said vertical member includes a plurality of adjustment apertures for allowing selective vertical positioning of said vertical member within said connecting structure;
wherein a minimum load sharing with the hitch unit of the vehicle is set via a lower adjustment aperture and a hitch pin therethrough; and
wherein a maximum load sharing with the hitch unit of the vehicle is set via an upper adjustment aperture and the hitch pin therethrough wherein the spring is placed over the lower member and is supported between a connecting member and the base of the vertical member.

3. A multi mode vehicle hitch support, said support comprising:
a horizontal connector having a tongue to attach to a vehicle's female hitch receiver;
said horizontal connector having a female hitch receiver at an opposing and from the tongue;
said horizontal connector having a mounting collar attached transversely thereto;
said mounting collar having a height adjustment aperture with a hitch pin;
a vertical beam slidably mounted within the mounting collar;
said vertical beam having a plurality of height adjustment apertures conforming in alignment with the collar height adjustment aperture and having a vertical slot to receive a connector pin which connects the vertical beam to a lower member wheel base via the vertical slot;
a torsion spring mounted between the lower member wheel base and the vertical beam;
said lower member wheel base having a spindle and a wheel;
wherein the lower member via the connector pin rides inside the vertical beam in the vertical slot under a torsion spring tension;
wherein a minimum load bearing from the vehicle's female hitch pin through a lower height adjustment aperture on the vertical beam; and
a maximum load bearing from the vehicles female hitch receiver is set using the hitch pin through an upper height adjustment aperture on the vertical beam wherein the spring is placed over the lower member and is supported between a connecting member and the base of the vertical beam.

4. The apparatus of claim 3, wherein the female hitch receiver at an opposing end from the tongue further comprises a locking hole with a hitch pin.

5. The apparatus of claim 3, wherein the horizontal connector further comprises a handle.

* * * * *